United States Patent [19]

Grambling

[11] Patent Number: 4,841,846
[45] Date of Patent: Jun. 27, 1989

[54] PNEUMATIC ACTUATORS WITH LIQUID SEALS FOR OIL AND GAS WELL SWABS

[76] Inventor: William D. Grambling, 5144 Newport Ave., Chevy Chase, Md.

[21] Appl. No.: 3,750

[22] Filed: Jan. 16, 1987

Related U.S. Application Data

[63] Continuation-in-part of Ser. No. 832,442, Feb. 24, 1986, abandoned.

[51] Int. Cl.$^4$ .................... F16J 15/40; B65D 53/00
[52] U.S. Cl. ............................... 92/60; 92/159; 92/174; 277/59; 277/72 FM
[58] Field of Search ............... 92/60, 65, 85 B, 174, 92/153, 158–160; 277/72 FM, 58, 59; 91/4 R

[56] References Cited

U.S. PATENT DOCUMENTS

| Re. 16,978 | 5/1928 | Joyce | 92/174 |
|---|---|---|---|
| 2,336,240 | 12/1943 | Gavin | 92/174 |
| 2,544,537 | 3/1951 | Levy | 277/59 X |
| 3,171,334 | 3/1965 | Rasmussen | 277/59 X |
| 3,653,298 | 4/1972 | Bilodeau | 92/65 |
| 3,692,368 | 9/1972 | Alexander | 92/153 X |
| 4,002,105 | 1/1977 | Bell | 92/65 |
| 4,041,845 | 8/1977 | Mean | 92/85 B |
| 4,474,106 | 10/1984 | Durenec | 92/159 |
| 4,499,728 | 2/1985 | Therond | 60/593 |
| 4,512,151 | 4/1985 | Yamatani | 92/174 |
| 4,620,419 | 11/1986 | Simson | 60/593 |
| 4,633,758 | 1/1987 | Kedzierski | 92/85 B |
| 4,750,409 | 6/1988 | Hendry | 92/158 |

FOREIGN PATENT DOCUMENTS

49479  4/1979  Japan ........................... 92/65

Primary Examiner—Robert E. Garrett
Assistant Examiner—George Kapsalas
Attorney, Agent, or Firm—Penrose L. Albright; Robert A. Miller

[57] ABSTRACT

Apparatus and method for maintaining viscous liquid sealing substances such a grease adjacent and in contact with seals utilized in pneumatic cylinder-and-piston actuators for oil and gas well swabs, the structure including a piston member which is slideable on the piston rod and which includes an external O-ring for sealing engagement between the cylinders and the piston member and an internal O-ring which is in sealing engagement between the piston member and the piston rod. The piston member is resiliently urged by a compression spring towards the actuating piston and the viscous liquid is trapped between the actuating piston and the slideable piston member. A further like slideable piston member may also disposed on an extension of the piston rod on the opposite side of the actuating piston which is also urged towards the actuating piston. Viscous liquid is trapped between the latter slideable piston member and the actuating piston. With upright piston rods, a viscous liquid seal may float on top of the actuating piston. This liquid seal may be a lubricating oil additive which increases in viscosity as its temperature is increased within the usual ranges of oil well pipe temperatures.

13 Claims, 2 Drawing Sheets

PNEUMATIC ACTUATORS WITH LIQUID SEALS FOR OIL AND GAS WELL SWABS

RELATED APPLICATIONS

This is a continuation-in-part of my Application Ser. No. 832,442 filed Feb. 24, 1986, now abandoned, and incorporates by reference the disclosures of my Applications Ser. Nos. 832,443 and 832,444, also filed Feb. 24, 1986.

BACKGROUND OF THE INVENTION

1. Field of the Invention

This invention relates to pneumatic actuators, especially those comprising a cylinder, piston and one or more piston rods, for oil and gas well swabs where they are used to actuate valves for opening internal valves for allowing the fluid to pass through the swabs and closing such valves due to head pressure acting on the pistons as the swabs sink into the petroleum and other liquids in the well pipe.

2. Description of Prior Art

Sealing means for pneumatic apparatus for use in oil and gas well swabs as disclosed in U.S. Pat. No. 4,070,134 have been limited to the lipseals and O-rings surrounding the pistons.

SUMMARY OF THE INVENTION

The invention involves apparatus and method for sealing gasoperated pistons sliding in pneumatic cylinders that control valves in oil and gas wells of a type disclosed in U.S. Pat. No. 4,070,134, which is incorporated by reference herein. Seals composed of rubber or other resilient materials on pistons to retain a charge of gas, especially low-pressure gas, in a cylinder have been unsatisfactory for extended use because of "bubbling", or the slow leakage of gas past minute imperfections in the seals. Liquids, especially the very high viscosity oils and greases, have large molecules or, in any event, molecules which interact so they do not pass through those imperfections. The present invention places a second "sealing" piston adjacent to the actuating piston, separated by a slug of oil or grease. The sealing piston is slideable on the piston rod and has appropriate O-rings or lip seals which engage the piston rod and cylinder wall. A spring mounted on the piston rod applies slight pressure against the sealing piston. In another configuration, two sealing pistons are used, one on each side of the actuating piston. The pressure of an activating charge of gas applied to the actuating piston is, in reality, on the sealing piston, which, in turn, applies pressure through the trapped oil or grease to the actuating piston. The present invention precludes the actuating gas from coming into contact with the actuating piston's seals.

DESCRIPTION OF THE PREFERRED EMBODIMENTS

The present invention is especially useful where a trapped chamber of gas actuates, through a piston and piston rod, a mechanism which depends on a change of ambient pressure in a gas or oil well to work. Normally, a bellows would be used in such a situation but the stroke of a bellows is too limited for the apparatus and method involved. Over a period of time, however, with prior art structures the gas charge in the chamber tends to leak away, rendering the mechanism useless.

Figure 1:
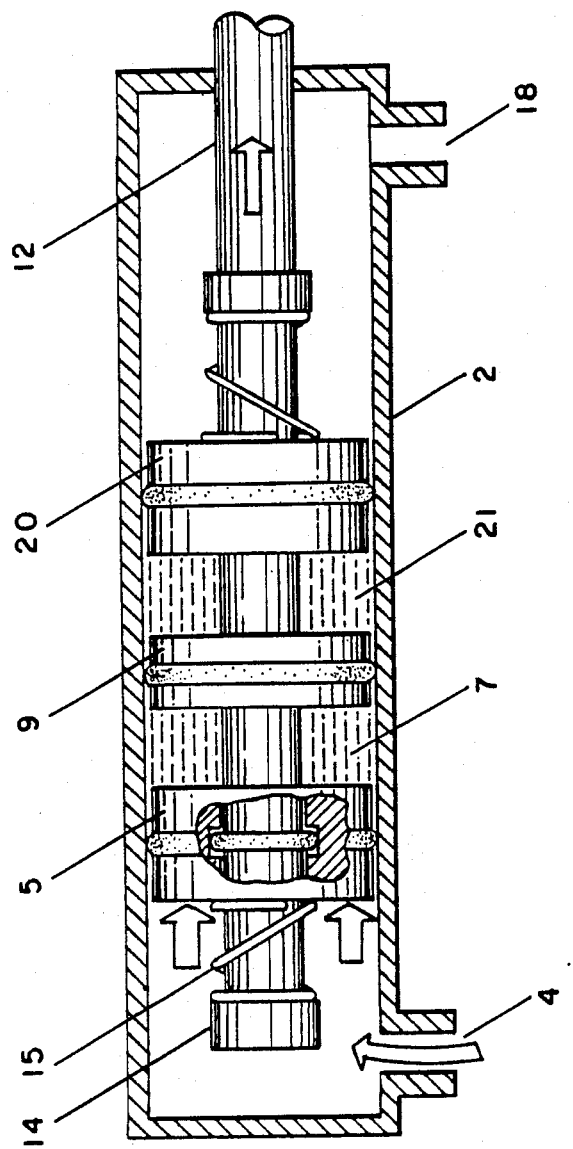
FIG. 1 illustrates an actuating piston between two slugs of oil or grease and two sealing pistons.

Referring to FIG. 1, a charge of gas is applied to the left chamber 4 of cylinder 2. The increased pressure in left chamber 4 is directed against sealing piston 5 and the force is transmitted through the slug of oil or grease 7 to the actuating piston 9, and then to a piston rod 12 which controls a valve (not shown) in the swab involved. A spring retainer 14 and spring 15 mounted on piston rod 12 apply a small constant pressure to the sealing piston 5. Actuating piston 9 is secured to piston rod 12 so they reciprocate in cylinder 2 together whereas sealing pistons 5 and 20 are slideably received on piston rod 12.

When the right chamber is subjected to the ambient pressures through the port 18, such pressures are applied in a like manner to sealing piston 20, the slug of oil or grease 21, and the actuating piston 9. Thus, the gas trapped in chamber 4 controls the extension of rod 12 which in turn opens or closes a valve in the oil and gas swab involved making it operative to pump petroleum and other fluids from the well in which the swab has been installed.

Gas may be charged in chamber 4 by simply inserting pistons 5, 9 and 20 aligned on rod 12 therein at atmospheric pressure with grease or oil slugs 7 and 21 filling the spaces between the pistons. A grease which is available and has proved practical is No. 2 cup grease which is the same as that normally used for automobile lubrication.

Figure 2:
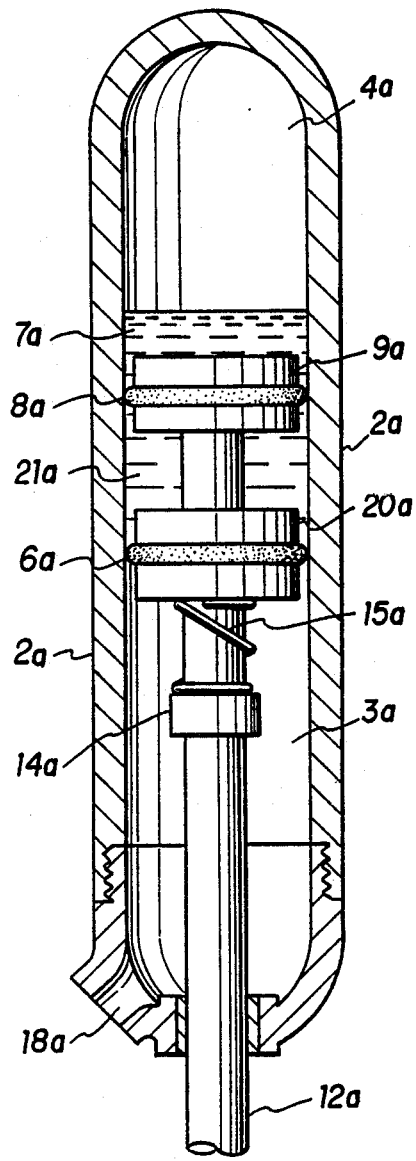
FIG. 2 illustrates an actuating piston in an upright cylinder with a layer of oil riding on its upper surface and a slug of grease between the actuating piston and an underlying sealing piston.

When the apparatus is used to control the valve in a swab as illustrated more specifically in FIG. 2 and such as disclosed in U.S. Pat. No. 4,070,134, the cylinder, here designated 2a, is generally vertical with the rod, here designated 12a, depending downwardly and the components above piston 9a are eliminated so that there is only one grease slug 21a. As a substitute for grease 7, a viscous liquid 7a is provided on top of piston 9a which rises up and down with piston 9a as the swab travels up and down the well pipe and fluid under pressure entering the lower chamber 3a through port 18a forces piston 9a via piston 20a (similar to pistons 5 and 20) and grease slug 21a upwardly relative to cylinder 2a. O-rings 6a and 8a ensure that grease slug 21a and viscous liquid 7a are retained in the locations illustrated relative to pistons 20a and 9a. Spring retainer 14a and spring 15a function essentially the same as parts 14 and 15 in FIG. 1. A workable and readily available viscous liquid for this purpose is STP Oil Treatment liquid or other similar lubricating oil additives which increase in viscosity as their temperatures are increased by ambient temperatures experienced in oil or gas wells. Its viscosity is preferably at least one hundred centistokes. The swab falls generally about one hundred feet in petroleum and/or other liquid in the oil or gas well before rod 12a closes the swab valve, causing the swab to commence its ascent carrying the petroleum and other fluids trapped above it due to the build-up in gas pressure under the swab. At its uppermost position in the well pipe, after the petroleum and other fluids have been discharged, the valve is caused to open wherein gas pressure in chamber 4a forces the pistons 9a and 20a and piston rod 12a downwardly for another cycle.

I claim:

1. Sealing apparatus for a piston and cylinder assembly, in a swab for removing fluid from wells which produce both gas and liquid, the piston and cylinder assembly being used to actuate valves in the swab due to head pressure acting on the piston as the swab sinks into liquid in the well, the apparatus comprising:
   a cylinder having one interior end hermetically sealed and the other interior end subject to ambient pressures caused by gas and liquid in the well, an actuating piston slidably and sealingly received in said cylinder, said actuating piston and said piston rod are movable together relative to said cylinder, said piston rod extending from said cylinder end subject to ambient pressures;
   a sealing piston member slidably received on said piston rod which is spaced from said actuating piston;
   a viscous material filling the space between said actuating piston and said sealing piston;
   a second viscous material lying on the upper surface of said actuating piston, said upper surface of said actuating piston and said hermetically sealed interior end of said cylinder creating a gas filled chamber; and
   sealing means between the interior walls of said cylinder and said actuating piston and said sealing piston which perform the function of effectively confining said viscous materials in position while said pistons and said piston rod move within said cylinder as the swab sinks into liquid in the well.

2. Sealing apparatus for a piston and cylinder assembly, the apparatus comprising:
   a cylinder having one end sealed and a second end partially open, an actuating piston slidably and sealingly received in said cylinder so as to create two chambers within said cylinder, said actuating piston having a piston rod affixed thereto so that said actuating piston and said piston rod are movable together relative to said cylinder, said piston rod extending from said second end and said chamber at said sealed end having a gas contained therein;
   a sealing piston member slidably received on said piston rod which is spaced from said actuating piston; and
   a viscous liquid filling the space between said actuating piston and said sealing piston wherein said actuating piston and said sealing piston are provided with sealing means between their respective side walls and the interior wall of said cylinder, said sealing means comprising O-rings and at least one further O-ring between the interior wall of said sealing piston and said piston rod.

3. Sealing apparatus in accordance with claim 1 comprising resilient means urging said sealing piston towards said actuating piston.

4. Sealing apparatus in accordance with claim 3 wherein said resilient means comprises a compression spring connected to said piston rod.

5. Sealing apparatus for a piston and cylinder assembly, the apparatus comprising:
   a cylinder, an actuating piston slidably and sealingly received in said cylinder, said actuating piston having a piston rod affixed thereto so that said actuating piston and said piston rod are movable together relative to said cylinder;
   a first sealing piston member slidably received on said piston rod which is spaced from said actuating piston;
   a viscous liquid filling the space between said actuating piston and said first sealing piston; and
   a second sealing piston slidably received on said piston rod spaced from said actuating piston opposite said first sealing piston, and a further viscous liquid filling the space between said second sealing piston and said actuating piston wherein said actuating piston and said first and second sealing pistons are provided with sealing means between their respective side walls and the interior wall of said cylinder, said sealing means comprising O-rings and at least one respective further O-ring between the interior wall of each of said first and second sealing pistons and said piston rod.

6. Sealing apparatus in accordance with claim 5 comprising resilient means urging said first and second sealing pistons and said actuating piston towards each other.

7. Sealing apparatus in accordance with claim 6 wherein said first and second resilient means comprise compression springs connected to said piston rod.

8. Sealing apparatus for a piston and cylinder assembly for actuating a valve in an oil or gas well swab in response to fluid pressure under the swab, the apparatus comprising:
   a cylinder having a substantially vertical axis, an actuating piston slideably and sealingly received in said cylinder;
   a piston rod affixed to said actuating piston so that said piston rod and said actuating piston are movable together relative to said cylinder and parallel to said axis;
   a hermetically sealed gas chamber comprising the part of said cylinder above said actuating piston;
   a layer of liquid which is sufficiently viscous and thick to prevent gas in said gas chamber from escaping therethrough, said liquid layer being carried on top of said actuating piston, and a sealing ring surrounding said actuating piston between said actuating piston and the interior walls of said cylinder and preventing said liquid from escaping from said gas chamber around said sealing ring.

9. Sealing apparatus in accordance with claim 8 comprising a sealing piston slideably received on said piston rod spaced below said actuating piston and a further viscous liquid filling said space.

10. Sealing apparatus in accordance with claim 9 wherein said further liquid comprises a grease.

11. Sealing apparatus in accordance with claim 9 wherein viscosity of said further liquid is substantially greater than the viscosity of said first mentioned liquid.

12. Sealing apparatus in accordance with claim 11 wherein the kinematic viscosity of said first mentioned liquid is at least one hundred centistokes.

13. Sealing apparatus in accordance with claim 11 wherein said first mentioned liquid comprises a lubricating oil additive which increases in viscosity as its temperature increases within limits.

* * * * *

UNITED STATES PATENT AND TRADEMARK OFFICE
CERTIFICATE OF CORRECTION

PATENT NO. : 4,841,846

DATED : June 27, 1989

INVENTOR(S) : William D. Gramling

It is certified that error appears in the above-identified patent and that said Letters Patent is hereby corrected as shown below:

Cover Page, heading, delete "Grambling" and insert therefor --Gramling--;

,item [76], delete "Grambling" and insert therefor --Gramling--.

Claim 3, line 1, delete "claim 1" and insert --claim 2--.

Signed and Sealed this

Twentieth Day of February, 1990

Attest:

JEFFREY M. SAMUELS

*Attesting Officer*         *Acting Commissioner of Patents and Trademarks*